US005887986A

United States Patent [19]

Pouliquen et al.

[11] Patent Number: 5,887,986

[45] Date of Patent: Mar. 30, 1999

[54] SUPPORT DEVICE WITH INTERCHANGEABLE WEARING MEMBERS FOR A ROTARY PART SUCH AS A TUBULAR FURNACE

[75] Inventors: Philippe Pouliquen, Bagnols/Ceze; Gilbert Tailland, Sernhac, both of France

[73] Assignee: Compagnie Generale des Matieres Nucleaires, Velizy-Villacoublay, France

[21] Appl. No.: 978,206

[22] Filed: Nov. 25, 1997

[30] Foreign Application Priority Data

Jan. 6, 1997 [FR] France .................................. 97 00047

[51] Int. Cl.[6] ...................................................... F16C 19/50

[52] U.S. Cl. ............................................ 384/549; 384/559

[58] Field of Search .................................... 384/549, 560, 384/584, 559, 510

[56] References Cited

U.S. PATENT DOCUMENTS 3,015,528 1/1962 Clark et al. .

3,431,034 3/1969 Saunders .

FOREIGN PATENT DOCUMENTS 2169466 9/1973 France .

2254079 5/1974 Germany .

3306745 A1 8/1984 Germany .

*Primary Examiner*—Lenard A. Footland

*Attorney, Agent, or Firm*—Pearne, Gordon, McCoy & Granger LLP

[57] ABSTRACT

To facilitate the replacement of wearing parts such as rollers (36, 42) on which is received a rotary part (10), a support device (12) is designed in such a way that the wearing parts belong to an interchangeable support member (30) interposed between a fixed body (16) and the rotary part (10). Replacement takes place by coupling to the interchangeable support member (30) a replacement support member (30'), using linking structures (56), and by rotating the assembly of the two members (30, 30') by 180° about the axis (14) of the rotary part. The two members are then uncoupled and the replacement support member linked to the fixed body (16) by locking structures (50).

10 Claims, 2 Drawing Sheets

SUPPORT DEVICE WITH INTERCHANGEABLE WEARING MEMBERS FOR A ROTARY PART SUCH AS A TUBULAR FURNACE

DESCRIPTION

1. Technical Field

The invention relates to a support device for a rotary part such as a tubular furnace. More specifically, the invention relates to a support device, whose wearing members such as rollers and which support the rotary part, can be replaced without it being necessary to dismantle said part.

The support device according to the invention can be used with advantage in all cases where the rotary part carried by said device can only be dismantled as a result of particularly long, difficult and fastidious manipulations. A preferred application concerns devices supporting rotary tubes of calcining furnaces more particularly used in the nuclear industry.

2. Prior Art

Certain rotary parts, such as the tubes of calcining furnaces used in the nuclear industry, are supported by rollers mounted in a cradle-like holder, whose upper face has an indentation with a semicircular cross-section, in which the tube is received.

In existing support devices, the replacement of the rollers on which rests the rotary tube of the calcining furnaces can only take place when the tube has previously been dismantled. In practice, the dismantling of the calcining furnace tube involves the disconnection and disassembly of an equipment associated therewith and which in particular includes four half-shells for heating the tube. When the operation has to take place in a hostile environment, such as occurs in the nuclear industry, the replacement of the rollers is made even more complicated by the fact that all the operations must be carried out remotely by means of remote manipulators. The total duration of the operation can then be roughly 5 weeks. It is clear that such a long downtime for an industrial installation constitutes a very serious handicap.

DESCRIPTION OF THE INVENTION

The invention relates to a support device for a rotary part, such as a tubular furnace, designed in such a way that the replacement of the wearing members can take place without dismantling the rotary part, so as to limit to the greatest possible extent the downtime of the installation as a result of the intervention.

According to the invention, this result is achieved by means of a support device for a rotary part having a given rotation axis and characterized in that it comprises:

- a fixed body having a concave bearing surface with an at the most semicircular cross-section, in a plane perpendicular to the rotation axis,
- an interchangeable support member receivable between the concave bearing surface and the part to be supported and having in crosssection along said plane the shape of a circular ring sector bounded by two lines forming between them a maximum angle of 180°,
- means for the unlockable fixing of the interchangeable support member to the fixed body and
- linking means for the end to end coupling of the interchangeable support member and a replacement support member, so that the latter can be brought to the location of the interchangeable support member without dismantling the rotary part, by a simultaneous rotation of said support members about the rotation axis, following an unlocking of the fixing means.

In a preferred embodiment of the invention, the rotation axis of the rotary part is substantially horizontal and the concave bearing surface is oriented upwards.

Preferably, the interchangeable support member has at least two idler rollers, whose spindles are parallel to the rotation axis of the rotary part, on which the latter rests. The interchangeable support member can also have a thrust roller, whose spindle is oriented radially with respect to the rotation axis of the rotary part.

The rollers are advantageously dismantlably mounted on the interchangeable support member. This arrangement makes it possible to reuse the support members, which considerably reduces the volume of waste and the cost of spare parts.

In the preferred embodiment of the invention, the interchangeable support member is in contact with the concave bearing surface by circumferentially distributed pads or shoes.

Advantageously, the interchangeable support member also has lateral flanges which can bear on the edges of the fixed body in order to prevent a relative displacement between the latter and the support member, parallel to the rotation axis of the rotary part.

The linking means can in particular comprise keys, which can be interposed between the facing ends of the interchangeable support member and the replacement support member, the keys having positioning pins which penetrate holes formed in said ends and locking members, equipped with studs which can be engaged in openings machined in the lateral faces of the members to be coupled.

The fixing means can also have plates, which can be fixed by fixing members to the terminal faces of the fixed body, extending the concave bearing surface at each of its circumferential ends, so as to bear on the end faces of the interchangeable support member.

According to an advantageous application of the invention, the rotary part is a tubular furnace.

BRIEF DESCRIPTION OF THE DRAWINGS

The invention is described in greater detail hereinafter relative to a non-limitative embodiment and with reference to the attached drawings, wherein show.

DETAILED DESCRIPTION OF A PREFERRED EMBODIMENT

Figure 1:
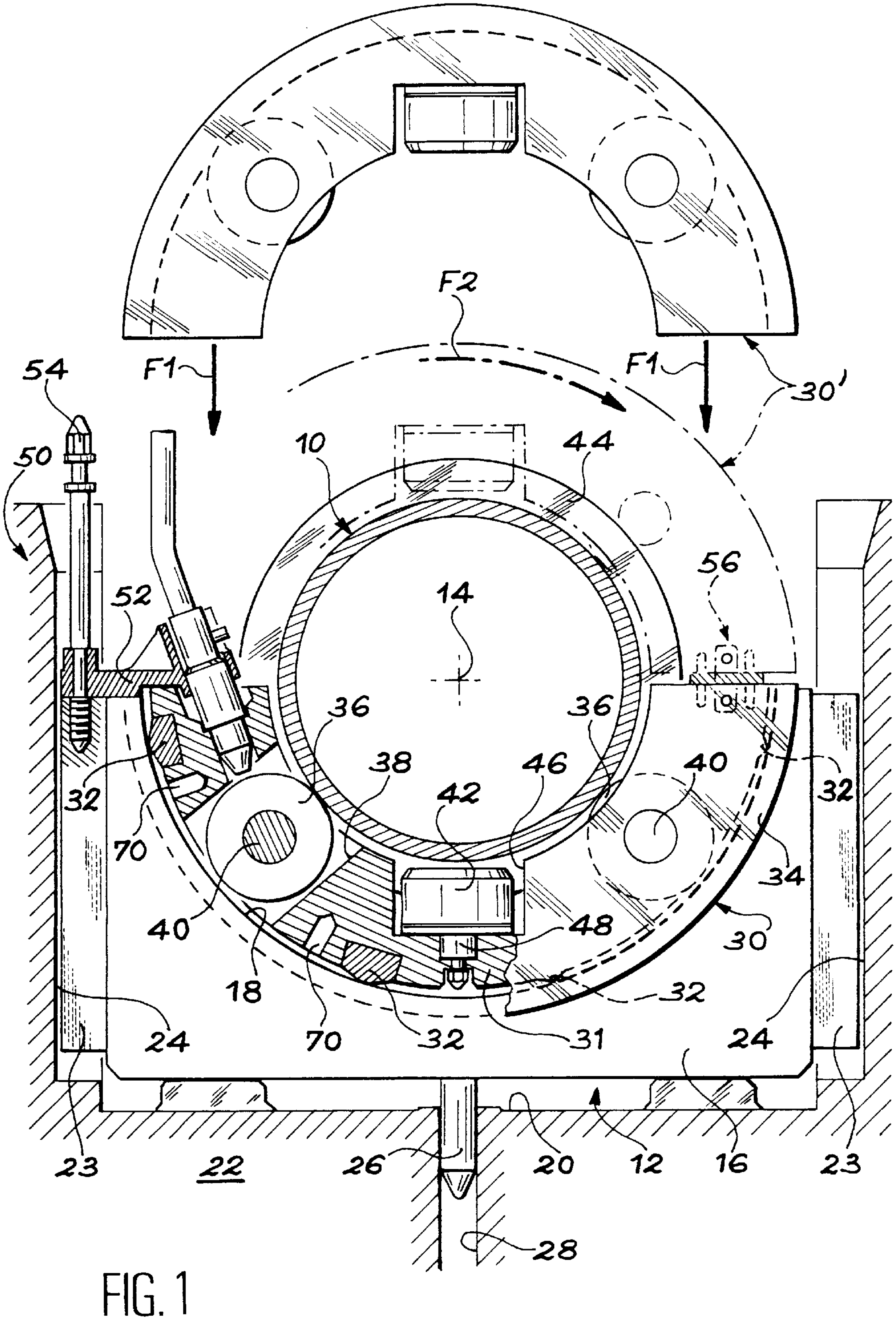
FIG. 1 A front view of a support device according to the invention, showing partly in section and in its operating state to the left of the drawing, a replacement support member being shown in continuous line form prior to its coupling to the support member to be replaced and in mixed line form following said coupling.

In FIG. 1, reference 10 designates a rotary part such as a calcining furnace tube used in the nuclear industry. However, the rotary part 10 could be of any other type without passing outside the scope of the invention.

The rotary part 10 rests on two support devices 12, so as to be able to rotate freely about a horizontal rotation axis 14. The means for rotating the rotary part 10 about the axis 14 can be of a random nature and do not form part of the invention.

The support devices 12 are identical and only one of them is illustrated in FIG. 1.

Each support device 12 comprises a fixed body 16 having on its upper face a concave bearing surface 18. In section along the plane of FIG. 1, i.e. along a plane perpendicular to the rotation axis 14, the concave bearing surface 18 is at the most semicircular.

In the embodiment illustrated in FIG. 1 and in non-limitative manner, the fixed body 16 is in the form of a block, whose lower, horizontal face rests in the bottom of a trench 20 formed in a fixed frame 22. The maintaining in position of the fixed body 16 in the trench 20 is ensured by the engagement of ribs 23, formed on the lateral faces of said body, in vertical grooves 24 made in the side walls of the trench 20. The fixed body 16 is centred by a centring finger 26 projecting vertically downwards from the lower face of the fixed body and penetrating a complimentary, vertical hole 28 formed in the bottom of the trench 20.

The support device 12 also comprises an interchangeable support member 30. Said member 30 is mainly formed by a plate 31, having in section in the plane of FIG. 1, i.e. in accordance with a plane perpendicular to the rotation axis 14, the shape of a circular ring sector defined by two lines forming between them a maximum angle of 180°. More specifically, the diameter of the outer surface of the plate 31 is slightly smaller than the diameter of the concave bearing surface 18 of the fixed body 16 and the diameter of the inner surface of the plate 31 slightly exceeds the external diameter of the rotary part 10. This dimensioning of the plate 31 enables the interchangeable support member 30 to be received between the concave bearing surface 18 of the fixed body 16 and the rotary part 10 to be supported, when the support device is in its operating state. Moreover, the arrangement described allows a pivoting of the interchangeable support member 30 between the fixed body 16 and the rotary part 10, about the rotation axis 14 of the latter.

In the operating state illustrated in FIG. 1, the interchangeable support member 30 is in contact with the concave bearing surface 18 of the fixed body 16 by shoes or pads 32 formed directly on the outer surface of the plate 31 or joined to the said surface in the manner illustrated in FIG. 1. In the latter case, the shoes 32 are made from an anti-seize material. Optionally, the shoes could be replaced by rotary rollers. The shoes 32 are circumferentially distributed over the entire outer surface of the support member 30, in order to bring about a reliable and stable bearing of said member on the concave bearing surface 18 of the fixed body 16. There are at least three shoes 32 in order to ensure a satisfactory positioning. In the embodiment illustrated in FIG. 1, the plate 31 has four shoes 32.

Means are also provided for preventing any displacement of the interchangeable support member 30 relative to the fixed body 16 parallel to the rotation axis 14 of the rotary part during the operating state of the support device. In the embodiment shown, said means are constituted by two lateral flanges 34, which project radially outwards, on each of the faces of the plate 31 parallel to the plane of FIG. 1, i.e. perpendicular to the rotation axis 14 of the rotary part 10. These lateral flanges 34 normally bear on the edges of the fixed body 16, i.e. on the faces of said body parallel to the plane of FIG. 1, when the support device 12 occupies its operating state. Any relative displacement between the interchangeable support member 30 and the fixed body 16, parallel to the rotation axis 14, is in this way prevented.

In the embodiment shown, the interchangeable support member 30 has two idler rollers 36 on which the rotary part 10 rests, so as to be able to freely rotate without friction about its rotation axis 14. Each of the rollers 36 is received in a recess 38 formed in the plate 31. The latter supports the spindles 40 of the rollers, which are oriented parallel to the rotation axis 14 of the rotary part 10. More specifically, the mounting of the rollers 36 on the plate 31 is such that the rollers can rotate freely with respect to said plate and project slightly beyond the inner surface of said plate 31. The rollers 36 are also positioned at locations symmetrical with respect to a median vertical plane of the interchangeable support member 30, said plane being perpendicular to the plane of FIG. 1 and contains the rotation axis 14.

It should be noted that, in a variant, the number of idler rollers 36 can exceed two, without passing outside the scope of the invention.

In the embodiment illustrated in FIG. 1, the interchangeable support member 30 also has a thrust roller 42, which ensures a rolling contact between an end flange 44 of the rotary part 10 and the support device 12. This arrangement makes it possible to prevent any displacement of the rotary part 10 with respect to the support device, parallel to the rotation axis 14, without introducing any friction between the two parts.

The thrust roller 42 is placed in a slot 46 made on the inner surface of the plate 31 and is mounted on the latter by a spindle 48 oriented radially with respect to the rotation axis 14 of the rotary part 10, so as to be able to rotate freely in the plate 31.

As illustrated in FIG. 1, the spindle 48 of the thrust roller 42 is advantageously placed in the aforementioned plane of symmetry of the interchangeable rotary part 30, perpendicular to the plane of FIG. 1 and containing the rotation axis 14 of the rotary part 10.

The support device according to the invention also comprises means 50 for the unlockable fixing of the interchangeable support member 30 to the fixed body 16. These unlockable fixing means are normally locked, in order to fix the interchangeable support member 30 with respect to the fixed body 16. They comprise two identical structures arranged symmetrically with respect to the median vertical plane perpendicular to the plane of FIG. 1 and containing the rotation axis 14 of the rotary part 10. FIG. 1 only illustrates the hand-left structure of the unlockable fixing means 50. Under normal operating conditions, it is clear that an identical structure is located on the right-hand part of the device, between the support member 30 and the fixed body 16.

Each of the two structures constituting the fixing means 50 incorporates a plate 52, normally locked by a fixing member, such as a screw 54, on the corresponding terminal face of the fixed body 16, i.e. on the upper face of the latter extending the concave bearing surface 18, beyond the corresponding circumferential end of said surface.

When the plates 52 are fixed to the terminal faces of the fixed body 16 by screws 54, they bear on upwardly turned end faces of the plate 31. They consequently oppose any rotation of the interchangeable support member 30 relative to the fixed body 16 about the rotation axis 14. This ensures a complete fixing of the interchangeable support member 30 with respect to the fixed body 16.

The support device 12 according to the invention also comprises linking means 56 designed in order to permit the end to end coupling of the interchangeable support member 30 and a replacement support member 30', which is identical to said interchangeable support member 30, when the latter has to be replaced.

The linking means 56 incorporate two identical structures, designed to be interposed between the facing ends of two support members 30 and 30', in order to couple them together to form a ring completely encircling the rotary part 10, as is diagrammatically illustrated in mixed line form in FIG. 1. The two structures forming the linking means 56 are then symmetrically arranged with respect to a plane perpendicular to the plane of FIG. 1 and containing the rotation axis 14 of the rotary part. Only the right-hand structure of said linking means 56 have been diagrammatically illustrated in FIG. 1.

A detailed description of one of the two structures constituting the linking means 56 will now be given with reference to FIG. 2.

Figure 2:
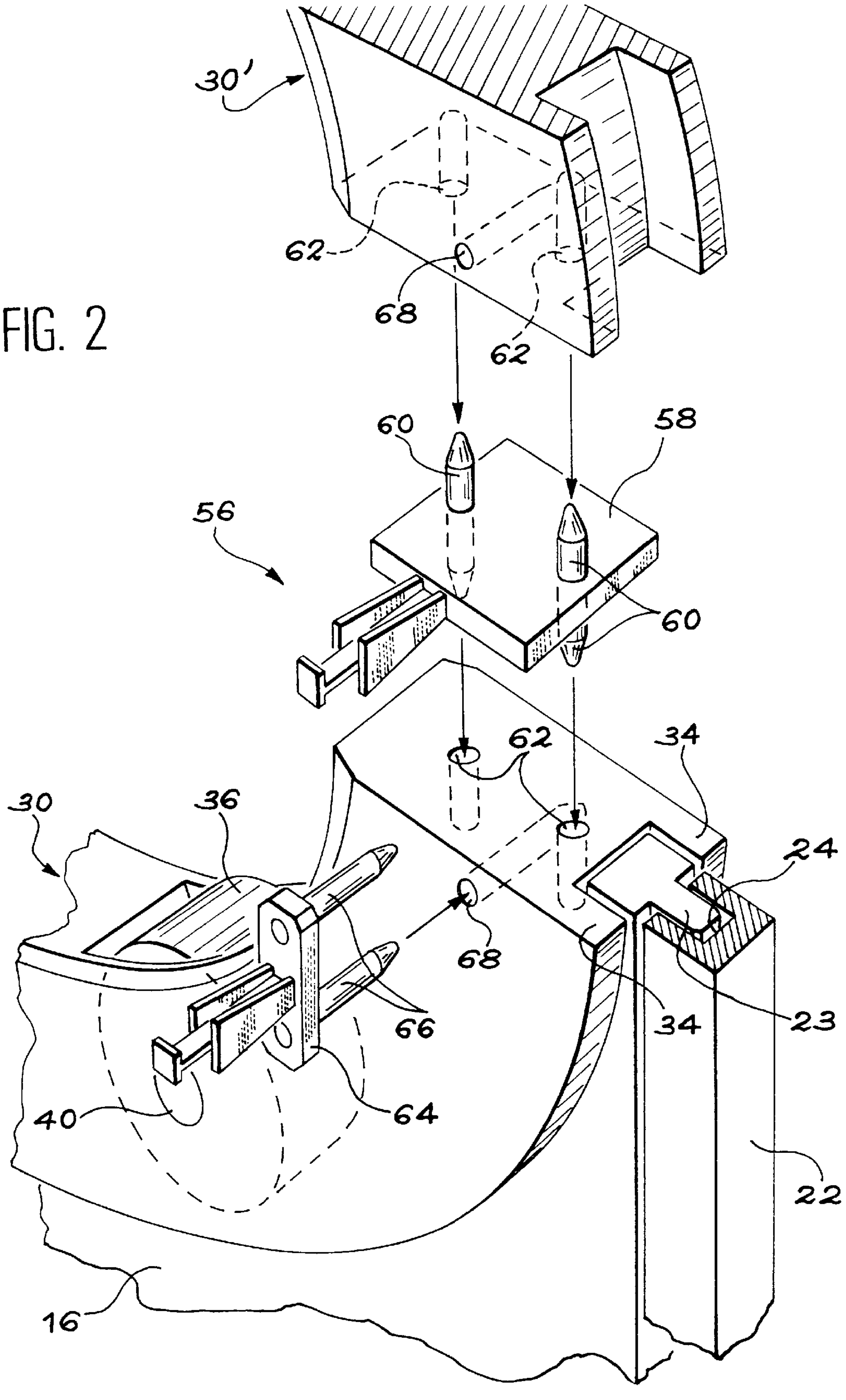
FIG. 2 A larger scale, perspective view showing the linking means permitting the coupling of the two support members.

As is illustrated in FIG. 2, each structure forming the linking means 56 comprises a key 58 in the form of a small plate which can be interposed between the facing ends of the interchangeable support member 30 and the replacement support member 30'. On each of its faces, said plate has at least two positioning pins 60, which project radially so as to be able to penetrate holes 62 formed in the facing ends of the support members 30 and 30'.

Each of the structures forming the linking means 56 also comprise a locking member 64 having at least two studs 66. These two studs 66 engage in openings 68 machined in the lateral faces of the support members 30, 30' to be coupled, after the keys 58 have been put into place. This ensures an effective coupling of the support members 30, 30'.

As a result of the arrangement described hereinbefore, it is possible to replace the wearing parts in the form of the rollers 36 and 42, e.g. when one of the rollers has become worn or when its rotation no longer takes place under satisfactory conditions, without it being necessary to dismantle the rotary part 10.

When such an intervention is necessary, it is merely required that the operators dismantle the fixing means 50 and the couple to the interchangeable support member 30 a replacement support member 30' with the aid of the linking means 56 and as illustrated by the arrows F1 in FIG. 1. Replacement can then take place by simultaneously rotating by 180° the two support members 30, 30' about the rotation axis 14 between the fixed body 16 and the rotary part 10. This rotation is symbolized by the arrow F2 in FIG. 1. When the replacement support member 30' has been brought into the position initially occupied by the interchangeable support member 30, said two members are uncoupled by dismantling the linking means 56. The fixing means 50 are then put back into place and the support device is again ready to operate.

In order to make it possible to simultaneously rotate the two support members 30, 30', radial openings 70 can be machined on the outer surface of the plate 31 of each of them, as is illustrated in FIG. 1.

In the embodiment shown, where the rotary part 10 is a tubular furnace used in the nuclear industry, the invention makes it possible to reduce from approximately 5 weeks to approximately 1 week the intervention time necessary for replacing the rollers. The different parts to be manipulated (screws 54, keys 58, locking members 64, etc.) are then provided in per se known manner with heads facilitating their gripping by remote manipulators.

As has already been stated, the invention is not limited to this application and does not solely relate to the case where the rotary part is supported by rollers. It does in fact apply to any type of support (sliding shoes, ball or roller bearings, fluid bearings, etc.).

It should finally be noted that the support members 30, 30' can be recovered after replacement. To this end, the rollers 36 and 42 are interchangeably mounted on said support members using not shown, suitable, mechanical means. When a support member has been dismantled in the aforementioned manner, its rollers are dismantled and replaced, e.g. using remote manipulators. A support member 30 equipped with new rollers 36 and 42 can consequently serve as a replacement support member 30' during a subsequent intervention. This makes it possible to considerably reduce the volume of waste, as well as the cost of spare parts.

We claim:

1. Support device for a rotary part having a given rotation axis, comprising:

a fixed body having a concave bearing surface with an at the most semicircular cross-section, in a plane perpendicular to the rotation axis, an interchangeable support member receivable between the concave bearing surface and the part to be supported and having in cross-section along said plane the shape of a circular ring sector bounded by two lines forming between them a maximum angle of 180°, means for the unlockable fixing of the interchangeable support member to the fixed body and linking means for the end to end coupling of the interchangeable support member and a replacement support member, so that the latter can be brought to the location of the interchangeable support member without dismantling the rotary part, by a simultaneous rotation of said support members about the rotation axis, following an unlocking of the fixing means.

2. Support device according to claim 1, wherein the rotation axis of the rotary part is substantially horizontal and the concave bearing surface is oriented upwards.

3. Support device according to claim 1, wherein the interchangeable support member has at least two idler rollers, whose spindles are parallel to the rotation axis on which the rotary part rests.

4. Support device according to claim 3, wherein it additionally has a thrust roller, whose spindle is oriented radially with respect to the rotation axis of the rotary part.

5. Support device according to claim 3, wherein each of the rollers is mounted in dismantlable manner on the interchangeable support member.

6. Support device according to claim 1, wherein the interchangeable support member is in contact with the concave bearing surface by circumferentially distributed shoes.

7. Support device according to claim 1, wherein the interchangeable support member has lateral flanges, which can bear on the edges of the fixed body, in order to prevent a relative displacement between the latter and the support member, parallel to said rotation axis.

8. Support device according to claim 1, wherein the linking means comprise keys interposable between the facing ends of the interchangeable support member and the replacement support member, the keys having positioning pins penetrating holes made in said ends and locking members, provided with studs engageable in openings machined in the lateral faces of the members to be coupled.

9. Support device according to claim 1, wherein the fixing means incorporate plates which can be fixed by fixing members to terminal faces of the fixed body, extending the concave bearing surface at each of its circumferential ends, so as to bear on end faces of the interchangeable support member.

10. Support device according to claim 1, wherein the rotary part is a tubular furnace.

* * * * *